United States Patent [19]

Lansing

[11] Patent Number: 5,193,502

[45] Date of Patent: Mar. 16, 1993

[54] SELF-STARTING MULTIFUEL ROTARY PISTON ENGINE

[76] Inventor: Joseph S. Lansing, 319 W. Valerio St. #4, Santa Barbara, Calif. 93101

[21] Appl. No.: 731,438

[22] Filed: Jul. 17, 1991

[51] Int. Cl.[5] .......................................... F02B 53/06
[52] U.S. Cl. .................................. 123/216; 123/247; 418/54
[58] Field of Search ............... 123/216, 234, 239, 247; 418/54, 60

[56] References Cited

U.S. PATENT DOCUMENTS

| | | | |
|---|---|---|---|
| 553,086 | 1/1896 | Wheildon | 418/54 |
| 1,310,157 | 7/1919 | Campo | 418/54 |
| 2,947,290 | 8/1960 | Froede | |
| 3,226,013 | 12/1965 | Toyoda et al. | |
| 3,405,692 | 10/1968 | Paschke | |
| 3,452,643 | 7/1969 | Pratt | 91/56 |
| 3,459,953 | 8/1969 | Hughes et al. | 290/2 |
| 3,485,220 | 12/1969 | Ferrari | 418/60 X |
| 3,716,314 | 2/1973 | Takahashi | 418/150 |
| 3,744,940 | 7/1973 | Pierce et al. | |
| 3,762,840 | 10/1973 | Merz | 418/5 |
| 3,800,760 | 4/1974 | Knee | |
| 3,869,863 | 3/1975 | Juge | 60/39.19 |
| 3,873,245 | 3/1975 | Doshi | 418/60 X |
| 3,918,859 | 11/1975 | Dugan et al. | 418/187 |
| 3,995,600 | 12/1976 | DeLuca et al. | 123/216 |
| 4,008,988 | 2/1977 | Putz | 418/54 |
| 4,047,856 | 9/1977 | Hoffman | 418/61 A |
| 4,167,375 | 9/1979 | Doshi | 418/54 |
| 4,215,533 | 8/1980 | Silvestri | 418/61 A X |
| 4,297,090 | 10/1981 | Hoffmann | 418/61 A |
| 4,417,862 | 11/1983 | Fenton | 418/54 |
| 4,507,066 | 3/1985 | Duffy | 418/61 A |
| 4,760,701 | 8/1988 | David | 60/595 |

FOREIGN PATENT DOCUMENTS 7508 of 1890 United Kingdom ................... 418/60
1068209 5/1967 United Kingdom .

OTHER PUBLICATIONS

Felix Wankel, "Rotary Piston Machines", 1965 Title page, pp. 24 and 25, and Model Sheet 18 London Iliffe Books Ltd.

Primary Examiner—Michael Koczo

[57] ABSTRACT

An engine with a single correct direction of rotation and one or more pairs of two-sided rotary pistons (22A and 22B, 38A and 38B, 46A and 46B) with the two pistons of one pair having continuous, overlapping torque production for self-starting operation. Each pair of multiple pairs of pistons and their housings (24A and 24B, 40A and 40B, 48A and 48B) have identical cross sections and graduated thicknesses relative to the other pairs to sustain multiple expansion. Two sets of inlet valves for fuel, oxidizer and liquid (58A, 60A, 62A and 58B, 60B, 62B) feed two aphodid type combustion chambers (54A and 54B) at the inlet ports (26A and 26B) in the smallest volume pair of housings (24A and 24B). The relative locations and orientations of the eccentrics of output shaft (20), pistons, housings and inlet and exhaust ports (26A, 26B, 28A, 28B, 42A, 42B, 44A, 44B, 50A, 50B, 52A, 52B) together with the timing and relative mass flows of valve operation controlled by engine control means (72) secure the correct direction of rotation, multifuel operation and, with multiple pairs of pistons and housings, minimal non-working volume and multiple expansion. Input controls (76) enable precise adjustment of power output and degree of expansive working.

6 Claims, 5 Drawing Sheets

SELF-STARTING MULTIFUEL ROTARY PISTON ENGINE

BACKGROUND

1. Field of Invention

This invention relates to engines for self-propelled road vehicles, specifically to a self-starting, multifuel rotary piston engine with reduced or zero exhaust emissions.

2. Description of Prior Art

Heretofore, engines for self-propelled road vehicles have been predominantly Otto or Diesel cycle. The predominant fuels have been gasoline and diesel fuel, both produced from petroleum, thereby depleting a non-renewable resource. The resultant exhaust emissions degrade environmental quality, damaging health and economic activity, both public and private.

One approach to amelioration of these depletions and degradation is the use of alternate fuels such as alcohol, propane, methane and hydrogen.

The disadvantages of each alternate fuel can be evaluated in terms of:
1. renewability
2. effect on environmental quality in the short term (smog)
3. effect on environmental quality in the long term (greenhouse).

On of the disadvantages of propane fuel is that it is not easily renewable; however, renewability is feasible for alcohol and methane through photosynthesis and for hydrogen through solar driven hydrolysis of water.

one of the disadvantages of alcohol fuel combustion is production of aldehydes, highly oxidizing components of smog.

The relative disadvantages of each alternate fuel as it contributes to the greenhouse effect can be estimated in terms of the relative amount of carbon dioxide per unit of thermal energy available from complete combustion. Gasoline, diesel and alcohol fuels all produce about the same amount of carbon dioxide per thermal energy unit, propane produces about 94% of that amount, methane about 80% and hydrogen none at all.

Whichever fuel is used, the fact that the Otto and Diesel cycle engines are not self-starting has resulted in the disadvantage that, according to the South Coast Air Quality Management District in El Monte, Calif., as reported by Science News of Feb. 10, 1990, vehicles idling in traffic burn one-quarter of all fuel sold in Los Angeles, Orange, Riverside and San Bernardino counties.

A self-starting engine is defined here as an engine that produces torque immediately upon demand from zero shaft speed at any shaft position. If an engine must be equipped with what is called a self-starter, it clearly cannot be self-starting engine. Otto and Diesel cycle engines cannot be self-starting. In contrast, some reciprocating piston steam engine can be self-starting as long as steam pressure is available. Heat engines that can be self-starting such as steam engines, Rankine cycle engines in general and Stirling cycle engines do need time to warm up before they can be self-starting and require some power input to maintain the warmed up state that enables self-starting.

Other heat engines such as turbines and Joule cycle engines in general are not self-starting.

Electric motors can be self-starting without a warm up period, but electric engines have the disadvantage that an expensive, heavy electric storage battery with limited life is required for a self-propelled vehicle.

A general disadvantages of the use of air as the oxidizer in heat engines is that the higher cycle temperature necessary to increase thermodynamic efficiency also increases production of nitrogen dioxide, a major component of smog.

The disadvantages of rotary piston machines with three sided pistons relative to those with two sided pistons are:
1. non-working volume is larger
2. apex seal leaning angle is larger
3. more apex and side seals are needed
4. more apex/side seal joints are needed
5. inlet and exhaust ports are adjacent, increasing heat exchange between them and thereby decreasing efficiency.

OBJECTS AND ADVANTAGES

Accordingly, in view of this background, one object of this invention is to provide an engine for self-propelled road vehicle that:
is simpler and more efficient,
is self-starting,
needs no warm up period,
uses the best of the alternate fuels and
improves environmental quality.

This engine is self-starting and needs no warm up period, thus increasing energy conservation by requiring no fuel input while a vehicle powered by this engine is decelerating or idling.

This engine can use propane, methane, hydrogen or any gaseous fuel interchangeably or in mixture.

This engine can be used with oxygen, or air with nitrogen partially or entirely removed, for decreased or zero production of nitrogen dioxide.

When this engine is used for combustion of hydrogen fuel and oxygen with subsequent condensation of exhaust to water and retention thereof there is zero exhaust for best environmental quality.

The condensed exhaust water can be recycled through solar driven hydrolysis for oxygen/hydrogen production for realization of the ultimate energy conservation goal of a permanently renewable energy resource with pristine environmental quality.

Another object and advantage of this engine is utility with stored oxidizer in oxygen poor environments such as those at high altitude, those under water and those that are extraterrestrial.

The advantages of rotary piston machines with two sided piston relative to those with three sided pistons are:
1. non-working volume is smaller
2. apex seal leaning angle is smaller
3. fewer apex and side seals are needed
4. fewer apex/side seal joints are needed
5. inlet and exhaust ports are not adjacent, decreasing heat exchange between them and thereby increasing efficiency.

Further objects and advantages of this invention will become apparent from consideration of the drawings and ensuing description.

DRAWING FIGURES

In the drawings, multiple, identical parts have the same number but different alphabetic suffixes.

DESCRIPTION

Figure 1:
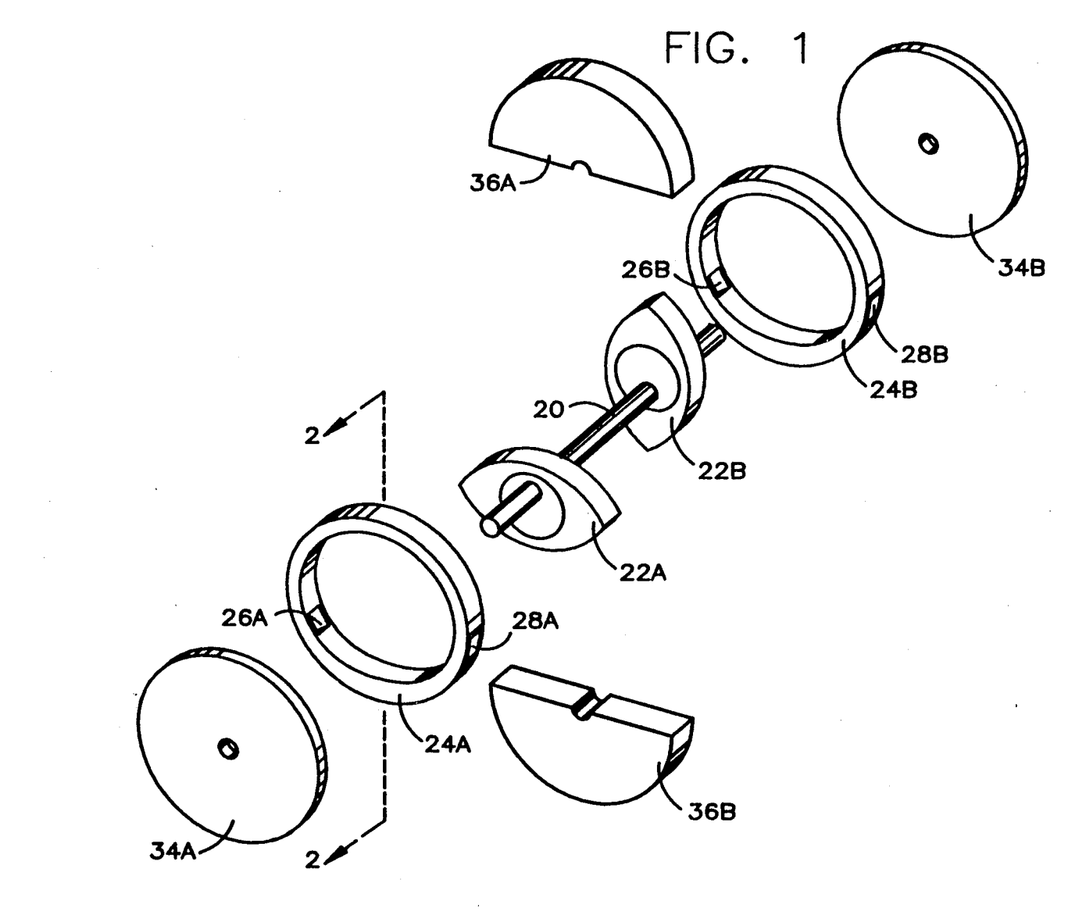
FIG. 1 of the drawings is an exploded view of a rotary piston fluid machine with a pair of housings and a pair of rotary pistons.

FIG. 1 is an exploded view of a rotary piston fluid machine. Felix Wankel, in his book Rotary Piston Machines, classifies this particular type of machine which has a two sided, rotary piston as internal axis PLM 1:2 S1i Group 5. Internal axis means just that, PLM is an acronym for planetary rotation machine, 1:2 is the ratio of the rotational velocities of the rotary piston and the output shaft, S1 represents slip engagement, or sliding contact between rotary piston and housing, i stands for sealing elements being installed on the rotary piston and Group 5 signifies a stationary chamber.

This type of rotary piston machine, well known in the art, is described as used in an internal combustion engine in U.S. Pat. No. 3,800,760 granted to Gerald John Knee on Apr. 2, 1974. Felix Wankel declares that these same machines "which have been known since 1834 as steam engines were designed by E. Galloway."

Various elements common to these and other rotary piston fluid machines such as phasing gears, seals, bearings, fasteners, etc. form no part of this invention and are omitted from the drawings and description for simplicity.

Referring to FIG. 1, output shaft 20 has two circular eccentrics that are disposed at 180 degrees to each other. Each eccentric rotatably receives a rotary piston, shown as 22A and 22B. The major axes of pistons 22A and 22B, which are the same as the lines joining the apices of each piston, are disposed at 90 degrees to each other.

Rotary pistons 22A and 22B are separately enclosed by a pair of housings 24A and 24B, the end walls 34A and 34B and the center wall formed by halves 36A and 36B. Inlet ports 26A and 26B and exhaust ports 28A and 28B open through housings 24A and 24B respectively. The insides of housings 24A and 24B are identical and parallel.

Figure 2:
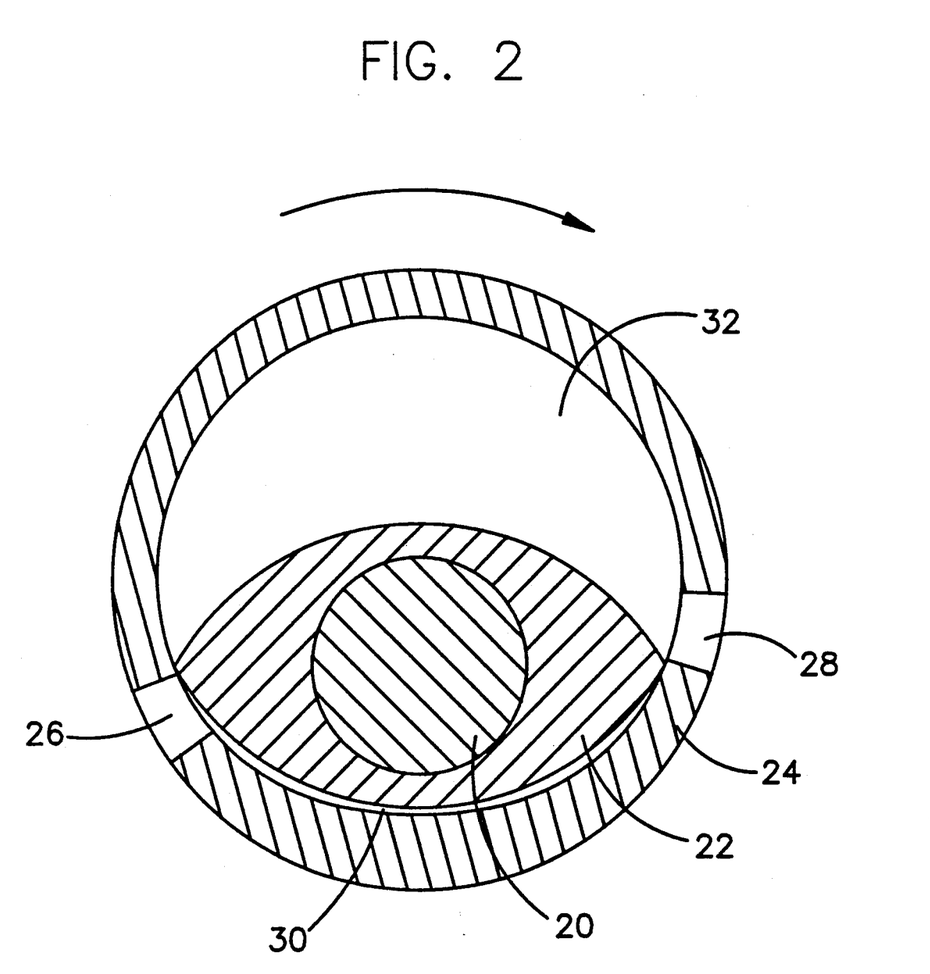
FIG. 2 of the drawings is a sectional view of a rotary piston in a housing taken along section line 2—2 of FIG. 1 showing the pistons of inlet and exhaust ports and the correct direction of rotation of the rotary piston and output shaft.

Referring to FIG. 2, an eccentric portion of output shaft 20 rotatably receives piston 22, whose apices are slidably received inside housing 24. The inside of this housing is shown as a singly lobed epitrochoid, although it can also be a curve parallel to such an epitrochoid or any of a variety of other closed curves, for example, the one described in U.S. Pat. No. 3,716,317 granted to Koichi Takahashi on Feb. 13, 1973, or other curves yet to be described.

The major axis of piston 22 is shown superimposed upon, collinear with, and parallel to the major axis of the curve inside housing 24. In this position cavity 28 has minimal volume and cavity 32 has maximal volume.

Inlet port 26 is located entirely within cavity 28 and as closely as possible to one apex of piston 22. Exhaust port 28 is located entirely within cavity 32 and as closely as possible to the other apex of piston 22.

Figure 3:
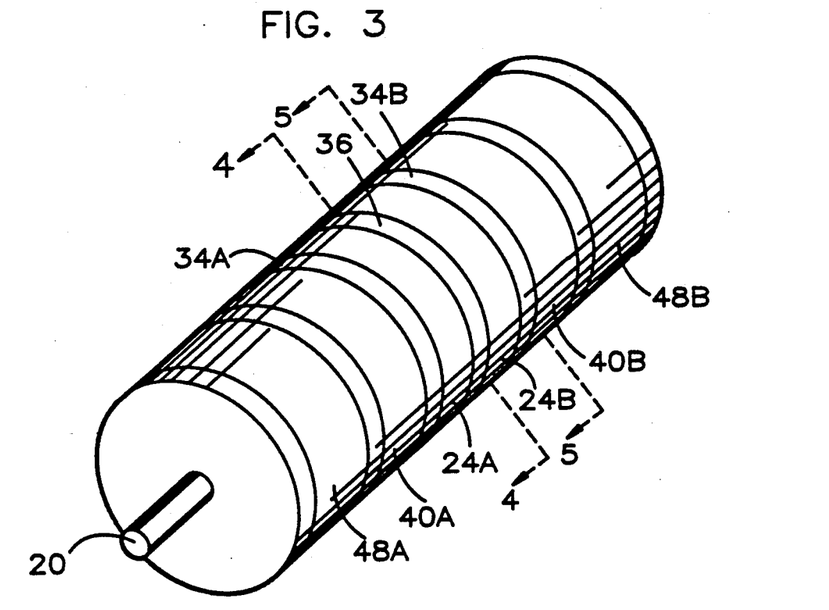
FIG. 3 of the drawings is a perspective view of a rotary piston fluid machine with three pairs of housings on a single output shaft.

Referring to FIG. 3, one presently preferred embodiment of this invention has three pairs of housings 24A/24B, 40A/40B and 48A/48B, each housing enclosing a piston rotatably received by shaft 20. The housing pair 24A/24B has the smallest chamber volume, housing pair 40A/40B has a larger volume, and housing pair 48A/48B has an even larger volume. Each housing in a pair has equal volume. Difference in volume between pairs of housings is achieved by difference in the width of the housings.

Housing pair 24A/24B is near the center of the length of shift 20. Individual housings of pairs 40A/40B and 48A/48B are separated, with the order of housings along shaft 20 being 48A, 40A, 24A, 24B, 40B and 48B.

Figure 4:
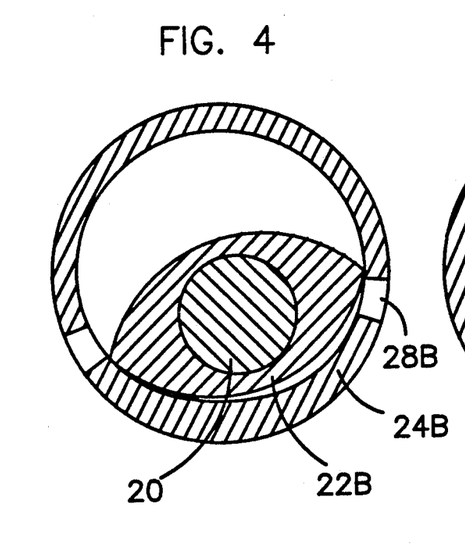
FIG. 4 of the drawings is a sectional view of a housing taken along section lines 4—4 of FIG. 3 showing one position of the rotary piston relative to inlet and exhaust ports.
Figure 5:
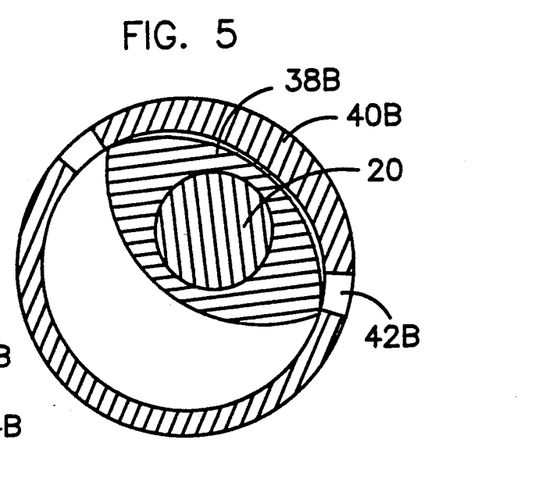
FIG. 5 of the drawings is a sectional view of a housing adjacent to the housing shown in FIG. 4 taken along section lines 5—5 of FIG. 3 showing the same features as FIG. 4 and the alignment of the inlet port of this housing with the exhaust port of the housing shown in FIG. 4.

Referring to FIGS. 4 and 5, inlet port 42B of housing 40B is aligned with exhaust port 28B of housing 24B by disposing the major axis of the curve inside housing 40B angularly about shaft 20 relative to the major axis of the curve inside housing 24B.

In exactly the same way, inlet 50B of housing 48B is aligned with exhaust 44B of housing 40B, inlet 42A of housing 40A is aligned with exhaust 28A of housing 24A and inlet 50A of housing 48A is aligned with exhaust 44A of housing 40A.

The curves inside each pair of housings remain parallel.

Figure 6:
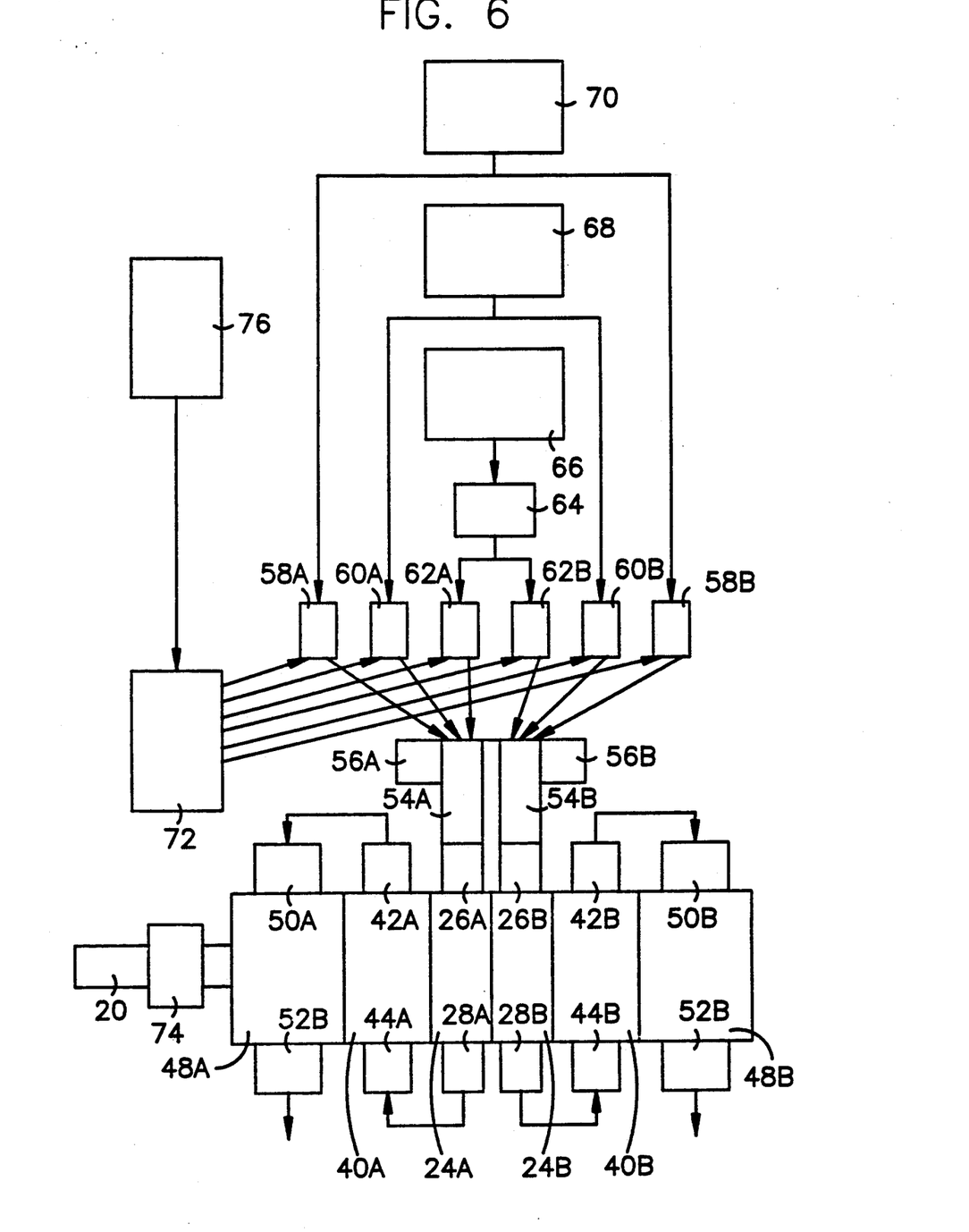
FIG. 6 of the drawings is a flow chart of an engine showing flow of hydrogen, oxygen and water from tanks, through valves, and into combustion chambers integral to the first pair of housings and the flow sequence through the rotary piston fluid machine.

Referring to FIG. 6, exhaust port 28A of housing 24A connects to inlet of housing 40A, exhaust 42A of housing 40A connects to inlet 50A of housing 48A, exhaust 28B of housing 24B connects to inlet 44B of housing 40B and exhaust 42B connects to inlet 50B of housing 48B.

It will be appreciated that these arrangements and alignments have the advantages that the volume of the connections between successive exhaust and inlet ports is minimal and that only one size of the specialized machinery used to manufacture the curves of the rotary pistons and housings can be used to manufacture all of the pistons and housings because they differ only in thickness.

Referring to FIGS. 4 and 5, the eccentrics of shaft 20 that receive pistons 22B and 38B are angularly oriented to each other so that when an apex of piston 22B is at the counterclockwise edge of exhaust port 28B, an apex of piston 38B is at the clockwise edge of inlet port 42B.

In exactly the same way, the eccentric of shaft 20 that receives piston 46B is angularly oriented to the eccentric of shaft 20 that receives piston 38B so that the same relationship obtains between pistons 46B and 38B and their respective inlet 50B and exhaust 42B as that which obtains between pistons 38B and 22B described in the previous paragraph.

The major axes of the two members of each pair of pistons remain oriented at 90 degrees to each other and their supporting eccentrics of shaft 20 remain oriented at 180 degrees. Thereby the same relationship will be obtained between pistons and ports suffixed A as described above for those suffixed B.

Referring to FIG. 6, combustion chambers 54A and 54B connect to housing pair 24A and 24B at inlet ports 26A and 26B respectively. Combustion chambers 54A and 54B also connect to valves 58A, 60A, 62A, 58B, 60B and 62B respectively.

Valves 62A and 62B connect to water pump 64 whose input side connects to water storage tank 66. Valves 60A and 60B connect to oxygen storage tank 68. Valves 58A and 58B connect to hydrogen fuel storage tank 70.

Engine control computer 72 connects to valves 58A, 60A, 62A, 58B, 60B and 62B. Computer 72 also connects to absolute rotary encoder 74 on output shaft 20. Finally, computer 72 connects to operator input controls 76.

Operation

Here is the sequence of operation of one presently preferred embodiment of this invention.

Referring to FIG. 6 of the drawings, hydrogen fuel and oxygen are stored under pressure in tanks 70 and 68 respectively. Water is stored in tank 66 and pressurized by water pump 64. Computer 72 regulates the operation of valves 58A, 60A, 62A, 58B, 60B and 62B to admit hydrogen fuel, oxygen and water to combustion chambers 54A and 54B. Combustion of hydrogen fuel and oxygen is immediately initiated by igniters 56A and 56B and continues until the valves are closed and all the fuel and oxygen that were admitted are combusted and all the water that was admitted is vaporized.

Igniters can be continuously active, for example, a high frequency electric spark, an electrically heated element at ignition temperature or a catalytic element, in order to obviate any need to time the operation of the igniters and to ensure immediate and continuous combustion while any combustibles are present.

Vaporization of the water lowers combustion product temperature to a value compatible with the materials of construction of the engine and increases the pressure of the combustion product which is steam.

Referring to FIG. 2 of the drawings, the steam enters, via inlet port 26, cavity of minimal volume 30 and drives rotary piston 22 to rotate.

For economy of exposition, the position of the mechanism illustrated in FIG. 2 of the drawings whereat the major axis of rotary piston 22 is superimposed upon, collinear with, and parallel to the major axis of the curve inside housing 24 will be referred to hereinafter as TDC for top dead center.

At TDC, pressure in the cavity of minimal volume 30 can drive rotary piston 22 to rotate in either direction. If rotary piston 22 rotates counterclockwise, cavities 30 and 32 communicate via inlet port 26 and rotary piston 22 is no longer driven to rotate.

Figure 7:
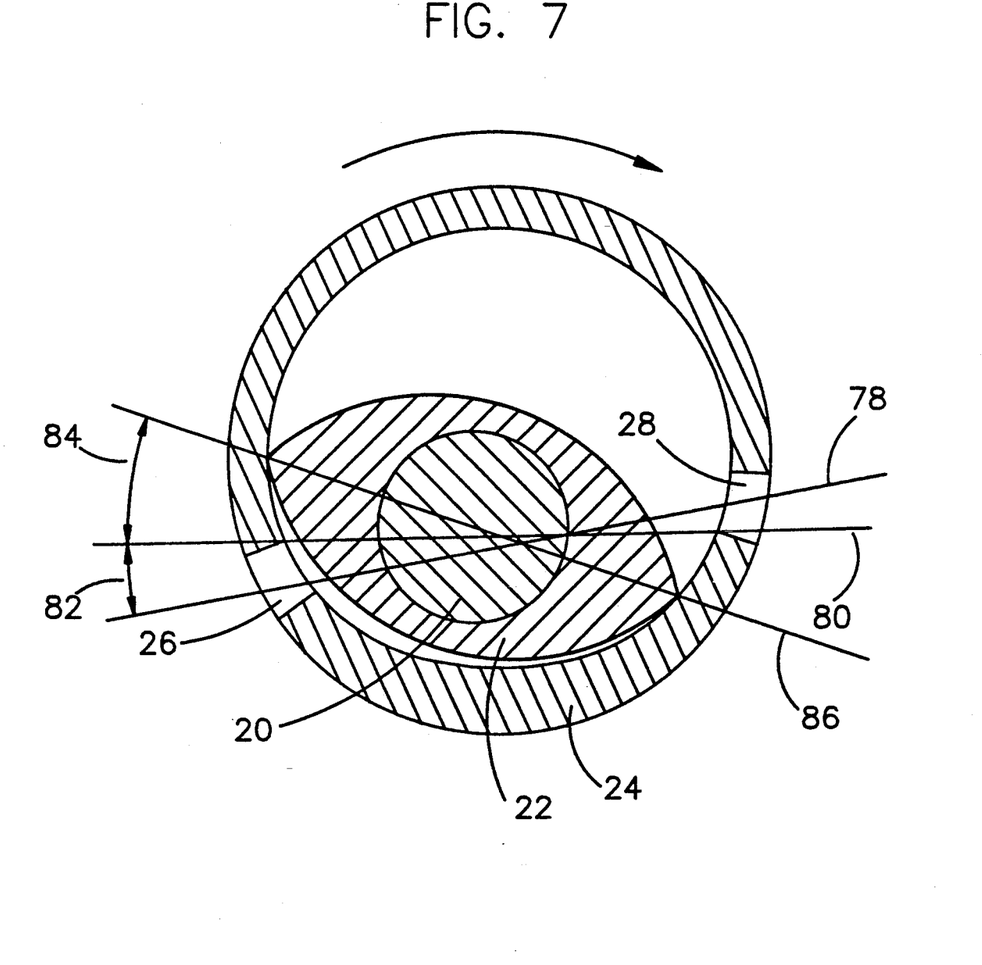
FIG. 7 of the drawings is a sectional view of a rotary piston in a housing taken along section line 2—2 of FIG. 1 showing the geometry of the position of the inlet and exhaust ports.

Referring to FIGS. 1, 2 and 6, in order to ensure that the correct, clockwise direction of rotation as shown by the arrow in FIG. 2 of the drawings ensues from starting engine operation with either rotary piston 22A or 22B at TDC, computer 72 uses absolute rotary encoder 74 to monitor the position of shaft 20 and thereby the positions of rotary pistons 22A and 22B relative to their inlet ports 26A and 26B respectively. Referring to FIG. 7, computer 72 automatically prevents the opening of any of the valves until their associated rotary piston has rotated a first angle 82 past TDC; it will be appreciated that angle 82 can also be used to locate the leading edges of inlet port 26 and exhaust port 28.

Computer 72 also automatically closes all valves before any rotary piston apex enters its associated exhaust port.

Referring to FIGS. 1, 2 and 7, to see how this engine is self-starting and produces continuous torque, consider the major axis of one rotary piston 22A at TDC; at that same instant the major axis of rotary piston 22B is at 90 degrees and is driven by the steam. This drive continues while rotary piston 22A rotates through angle 82 and while its valves 58A, 60A and 62A open, which, when completely open, result in full torque being produced by rotary piston 22A. Overlap between the torque from both rotary pistons is thus ensured if, after valves 58A, 60A and 62A open completely, valves 58B, 60B and 62B can close completely before the apex of rotary piston 22B enters exhaust port 28B. Rotary piston 22A continues to produce torque while the apex of rotary piston 22b transits the angular extent of its exhaust port 28B, after which rotary piston 22B is at TDC and the sequence repeats as above with piston 22B and associated parts replacing 22A in the narrative.

Thus the design criterion for self-starting and continuous torque production for this engine is that the sum of the angles of rotor rotation required for angle 82 plus the durations of valve opening plus valve closing plus rotor apex traversal of an exhaust port must be less than half pi radians or 90 degrees when duration is defined as the angle traversed by rotary piston 22 during any event.

Referring to FIG. 6, computer 72 also monitors the operator input controls 76 which can be in the form of the position of a conventional accelerator pedal and of the position of what will be called a cutoff lever or cutoff. Computer 72 responds to operator input controls 76 only insofar as that response does not conflict with the automatic openings and closings of valves by computer 72 that are described above.

When the accelerator pedal is not depressed, computer 72 will not open any of the valves. When the accelerator pedal is depressed, computer 72 will open the valves, and as the pedal is depressed farther, computer 72 opens the valves farther.

For operator convenience, the cutoff lever can be similar in appearance and position to a gear shift lever. It can have several discrete positions or stay in whatever position it is set along a continuous range of movement fore and aft. When the cutoff is set fully aft, computer 72 opens valves and then closes valves as soon as possible. When cutoff is set fully forward, computer 72 opens valves and keeps them open as long as possible. At intermediate cutoff positions computer 72 keeps the valves open for a proportionate portion of the longest possible opening.

At all cutoff positions except fully forward, the steam works expansively against the rotary pistons for a portion of their rotation and therefore with greater efficiency.

In order for this engine to use different fuels, oxidizers and liquids most efficiently, the relative mass flow rates or valve opening sizes are set to appropriate values by the operator selecting an appropriate control program stored in computer 72.

Referring to FIGS. 3, 4, 5 and 6, the additional housings 40A, 40B, 48A and 48B and pistons 38A, 38B, 46A and 46B enable multiple expansion of the steam, the classic method for increasing efficiency. The combination of the angular offset between successive piston pairs 22A/22B, 38A/38B and 46A/46B and the steam flow path shown in FIG. 6 results in overlap of torque production and increased power output.

SUMMARY, RAMIFICATIONS AND SCOPE

Thus the reader will see that the engine of this invention provides a clean, powerful, efficient and reliable prime mover for road vehicles.

While the above description contains many specifics, these should not be construed as limitations on the scope of this invention, but rather as an exemplification of one preferred embodiment thereof. Many other variations are possible.

For example, the major axes of the curves inside each pair of housings can be rotated relative to each other rather than parallel as long as the eccentrics and pistons are disposed so that when the major axis of one of the member pistons of the pair in the pair of housings with the smallest volume is at TDC, the major axis of the other member piston is at 90 degrees to its own TDC.

Referring to FIG. 7, the function that angle 82 serves, to ensure the correct direction of rotation, can instead be served by a second angle 84 or by a combination of angles 82 and 84. Second angle 84 is used to initiate opening of intake valve 54 at inlet port 26. Angle 84 is the angle between two planes 80 and 86.

A top dead center reference plane 78 is defined by the major axis of piston 22 when at TDC and the rotational axis of piston 22.

Another plane 80 is defined by angle 84 and another position of piston 22 major axis and the piston axis.

Inlet 26 is located in a cavity of smaller volume and adjacent to the intersection of plane 80 with the inside of housing 24. Exhaust 28 is on the other side of plane 80 and adjacent to the other intersection of plane 80 with the inside of housing 24.

It will be appreciated that angles 82 and 84 can be very small angles with either equal to zero, and that the correct direction of rotation is arbitrary but fixed by the design of a particular embodiment of this engine.

First angle 82 has a value between infinitesimal and half pi radians, or 90 degrees, minus the sum of duration of opening, dwell and subsequent closing of valves 58, 60 and 62, that is, the angle traversed by rotary piston 22 during those events, plus the angle traversed by rotary piston 22 while its apex travels from edge to edge of exhaust port 28. First angle 82 is preferably as small as possible in order to minimize the non-working volume, that is, the volume of the smaller cavity present between housing 24 and rotary piston 22 when valves 58, 60 and 62 first open, and to maximize the expansion ratio, that is, the ratio of the volume of the larger cavity present between housing 24 and rotary piston 22 just as the apex of rotary piston 22 enters exhaust port 28 to the volume of the smaller cavity present between housing 24 and rotary piston 22 when valves 58, 60 and 62 first open, but large enough to ensure that the correct direction of rotation occurs. As well as the infinitesimal angle requisite to ensure that the correct direction of rotation shown by the arrow in FIG. 1 occurs in a geometrically perfect mechanism, a real mechanism will require some small angular design increment to compensate for the actualities of the mechanism's construction and allowance for the wear that will occur during the designed lifetime of the mechanism. In the presently preferred embodiment described herein, since the angular position of rotary piston 22 is derived from the output of absolute rotary encoder 74, the small angular design increment to the infinitesimal angle includes allowance for the angular uncertainty of encoder 74 as well as the clearances in the bearings between output shaft 20 and housing 24 and output shaft 20 and rotary piston 22, the backlash of the phasing gears, and the changes due to wear of all of the above that are predicted for the designed lifetime of the mechanism. The design increment for a practical mechanism constructed according to this presently preferred embodiment is one tenth radian or six degrees. It will be appreciated that the function of first angle 82 can be fulfilled by second angle 84 or a combination of first angle 82 and second angle 84. Therefore either angle 82 or 84 can be zero as long as the other angle is adequate.

The operation of each valve can be analyzed in terms of two variables, how far the valve is open, or mass flow rate, and how long the valve is open, or cutoff. These two variables can be controlled with one valve as described above in the operation section, or with two separate valves. Mass flow rate can be controlled by a conventional, variable orifice valve whose response time is not critical. Cutoff, or dwell, can be controlled by a simple open or closed valve driven by a fast solenoid. Fast, solenoid driven valves are available with valve opening and closing rates that enable highway speeds with direct drive between this engine and the drive wheels of a conventional self-propelled vehicle, obviating the need for any transmission gears except forward and reverse.

Some or all of the control of the cutoff lever function can also be performed by a mechanism or servomechanism such as those of conventional automatic transmissions.

While this engine is peculiarly well suited for use in self-propelled road vehicles, it has similar advantages for use in other vehicles and in non-vehicular applications. For example, for intermittent duty, fixed load applications such as driving compressors, a single piston version of this engine with mechanically driven valves, a flywheel and a self-starter retains all the advantages of this engine except that it is not self-starting and does not produce continuous torque.

Accordingly, the scope of this invention should be determined not by the embodiment illustrated and described, but by the appended claims and their legal equivalents.

I claim:
1. An engine comprising:
   (a) a pair of substantially identical stationary housings, and
   (b) a pair of substantially identical, two sided rotary pistons slidably received within said housings at apices of said rotary pistons, and
   (c) an output shaft rotatably supported by said housings, said output shaft having two eccentrics each rotatably receiving one of said rotary pistons so that two variable volume cavities are formed inside each said housing, said output shaft having a rotational velocity ratio to said rotary pistons of two to one and a single, arbitrary, correct direction of rotation, and

(d) said housings, rotary pistons and eccentrics oriented relative to each other so that when a major axis, or a line defined by said apices, of one of said rotary pistons is in a top dead center orientation relative to its said housing such that said two variable volume cavities are of minimal and maximal volume, other of said rotary pistons has its own said major axis at an angle of half of pi radians, or 90 degrees, relative to its own said top dead center orientation in its own said housing, and (e) an inlet port and an exhaust port in each of said housings said inlet port opening into said cavity of minimal volume and located on one side of a plane and adjacent to an intersection of said plane with the inside of said housing, said exhaust port being on the other side of said plane and adjacent to a second intersection of said plane with said inside of said housing, said plane being defined by one position assumed by said major axis of said rotary piston contained by said housing and rotational axis of said rotary piston, said plane being rotated by a first angle in said correct direction of rotation from a reference plane defined by said rotary piston major axis in said top dead center orientation and said rotary piston rotational axis, said correct direction of rotation being defined as said apices moving away from adjacent said inlet port and adjacent said exhaust port when said rotary piston major axis is at said first angle, and (f) separate inlet valve means for each said inlet port for a working fluid that is at a higher pressure than the pressure at said exhaust ports, said valve means having a total of opening duration plus closing duration such that said total plus duration of traversal by said apex of said exhaust port plus said first angle plus a second angle is less than or equal to half of pi radians, or 90 degrees, the duration defined as the angle traversed by said rotary piston major axis during any other event, and (g) engine control means that sense the angle of each said rotary piston major axis relative to said plane and open said valve means when said rotary piston major axis has rotated said second angle past said plane, the sum of said first angle and said second angle being more than zero and less than half pi radians, or 90 degrees, minus the sum of durations of said valve means opening and said valve means closing and traversal of said exhaust port by said apex, and that close said valve means before either said apex enters said exhaust port.

2. The engine of claim 1 further including:
(a) multiple said pairs of housings and said pairs of rotary pistons with each said housing pair having substantially identical cross sections and graduated internal volume relative to each other of said housing pair, said graduated volume achieved by graduated thickness, and
(b) said housing pair of smallest volume located near the midpoint of said output shaft, with each half of said housing pair that is next larger in volume located farther towards the ends of said output shaft, one said half of said housing pair farther towards one end of said output shaft and the other said half of said housing pair farther toward the other end of said output shaft, with each sucessively larger said housing pair located similarly, and
(c) each said housing pair of larger volume rotated relative to adjacent smaller said housing pair such that said inlet ports of said adjacent larger housing pair are adjacent to said exhaust ports of said adjacent smaller housing pair, each said exhaust port having hermetically sealed communication with adjacent said inlet port, and
(d) said eccentrics of said output shaft angularly oriented to each other so that when said apices of said rotary pistons of said adjacent smaller housing pair enter their respective said exhaust ports, then said apices of said rotary pistons of said adjacent larger housing pair have completed transit of their respective said inlet ports.

3. An engine comprising:
(a) a pair of substantially identical stationary housings, and
(b) a pair of substantially identical, two sided rotary pistons slidably received within said housings at apices of said rotary pistons, and
(c) an output shaft rotatably supported by said housings, said output shaft having two eccentrics each rotatably receiving one of said rotary pistons so that two variable volume cavities are formed inside each said housing, said output shaft having a rotational velocity ratio to said rotary pistons of two to one and a single, arbitrary, correct direction of rotation, and
(d) said housings, rotary pistons and eccentrics oriented relative to each other so that when a major axis, or a line defined by said apices, of one of said rotary pistons is in a top dead center orientation relative to its said housing such that said two variable volume cavities are of minimal and maximal volume, other of said rotary pistons has its own said major axis at an angle of half of pi radians, or 90 degrees, relative to its own said top dead center orientation in its own said housing, and
(e) an inlet port and an exhaust port in each of said housings said inlet port opening into said cavity of minimal volume and located on one side of a plane and adjacent to an intersection of said plane with the inside of said housing, said exhaust port being on the other side of said plane and adjacent to a second intersection of said plane with said inside of said housing, said plane being defined by one position assumed by said major axis of said rotary piston contained by said housing and rotational axis of said rotary piston, said plane being rotated by a first angle in said correct direction of rotation from a reference plane defined by said rotary piston major axis in said top dead center orientation and said rotary piston rotational axis, said correct direction of rotation being defined as said apices moving away from adjacent said inlet port and adjacent said exhaust port when said rotary piston major axis is at said first angle, and
(f) a combustion chamber at each said inlet port that contains ignition means, and
(g) separate inlet valve means for each said combustion chamber for fuel and oxidizer, said valve means having a total of opening duration plus closing duration such that said total plus duration of traversal by said apex of said exhaust port plus said first angle plus a second angle is less than or equal to half of pi radians, or 90 degrees, the duration defined as the angle traversed by said rotary piston major axis during any other event, and
(h) engine control means that sense the angle of each said rotary piston major axis relative to said plane and open said valve means when said rotary piston major axis has rotated said second angle past said plane, the sum of said first angle and said second angle being more than zero and less than half pi radians, or 90 degrees, minus the sum of durations of said valve means opening and said valve means closing and traversal of said exhaust port by said apex, and that close said valve means in time for combustion to be completed before said apex enters said exhaust port.

4. The engine of claim 3 with the further inclusion of:
(a) multiple said pairs of housings and said pairs of rotary pistons with each said housing pair having substantially identical cross sections and graduated internal volume relative to each other of said housing pair, said graduated volume achieved by graduated thickness, and
(b) said housing pair of smallest volume located near the midpoint of said output shaft, with each half of said housing pair that is next larger in volume located farther towards the ends of said output shaft, one said half of said housing pair farther towards one end of said output shaft and the other said half of said housing pair farther toward the other end of said output shaft, with each sucessively larger said housing pair located similarly, and
(c) each said housing pair of larger volume rotated relative to adjacent smaller said housing pair such that said inlet ports of said adjacent larger housing pair are adjacent to said exhaust ports of said adjacent smaller housing pair, each said exhaust port having hermetically sealed communication with adjacent said inlet port, and
(d) said eccentrics of said output shaft angularly oriented to each other so that when said apices of said rotary pistons of said adjacent smaller housing pair enter their respective said exhaust ports, then said apices of said rotary pistons of said adjacent larger housing pair have completed transit of their respective said inlet ports.

5. The engine of claim 3 with the further inclusion of valve means for injection of liquid into said combustion chambers, said engine control means closes said liquid valve means in time for said liquid to be completely vaporized before said apex enters said exhaust port.

6. The engine of claim 4 with the further inclusion of valve means for injection of liquid into said combustion chambers, said engine control means closes said liquid valve means in time for said liquid to be completely vaporized before said apex enters said exhaust port.

* * * * *